No. 857,774. PATENTED JUNE 25, 1907.
H. TURNER.
MEANS FOR PREVENTION OF SKIDDING OR SIDE SLIPPING OF MOTORS AND OTHER VEHICLES.
APPLICATION FILED DEC. 14, 1906.

Witnesses:

Inventor:
Henry Turner
by his attorney

UNITED STATES PATENT OFFICE.

HENRY TURNER, OF LONDON, ENGLAND.

MEANS FOR PREVENTION OF SKIDDING OR SIDE-SLIPPING OF MOTORS AND OTHER VEHICLES.

No. 857,774.   Specification of Letters Patent.   Patented June 25, 1907.

Application filed December 14, 1906. Serial No. 347,797.

*To all whom it may concern:*

Be it known that I, HENRY TURNER, a subject of the King of Great Britain and Ireland, residing at London, England, have invented a new and useful Improvement in Means for the Prevention of Skidding, of which the following is a specification.

The object of my invention is the prevention of the "skidding" or side slipping of automobiles or motors and other road vehicles, and the improved means hereinafter more particularly described and claimed include an independent wheel hereinafter termed a "caster," placed in a given position on the under side of the floor of the vehicle; the swiveled stem of this caster being connected with suitable valves working in sand boxes arranged to distribute the sand beneath a pair of the main wheels of the vehicle respectively. Any skidding or side slipping of the vehicle tending to force this caster to one side, turns a disk connected therewith and operates the valve on the side toward which the wheel is slipping, so as to allow a stream of dry sand or other suitable material to be deposited at the inside and in front of the vehicle wheel. When the vehicle is reversed, or backed, or when otherwise necessary, the device can be locked, thus keeping the caster from acting upon the valves.

A sheet of drawings accompanies this specification as part thereof.

Figure 1:
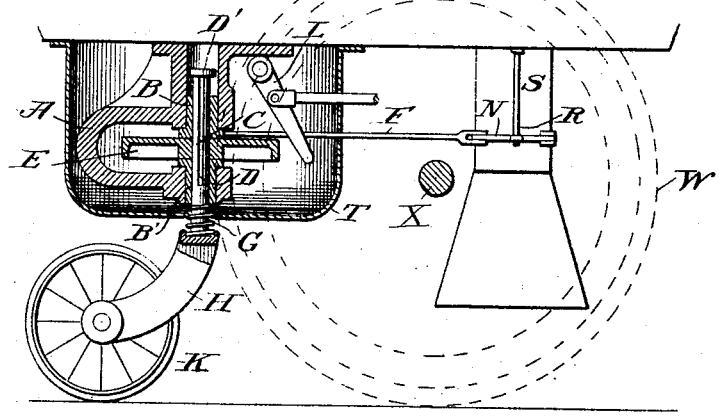
Figure 2:
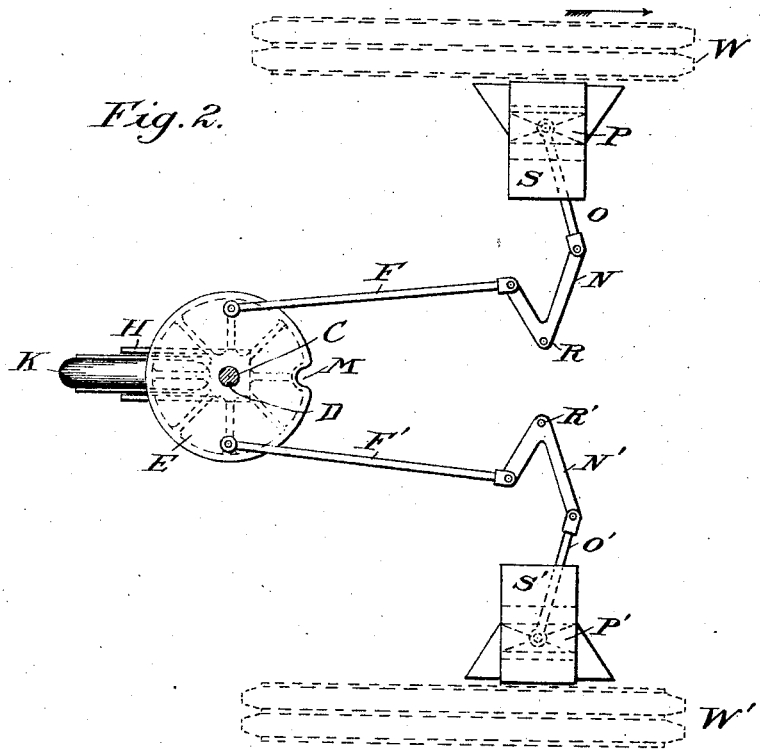

Figure 1 represents a fragmentary vertical longitudinal section with the caster in elevation at the plane of section, and Fig. 2 represents a top view partly in section and with some of the parts shown in Fig. 1 omitted.

Like reference letters refer to like parts in both figures.

My device can be arranged and supported in any suitable position, but I prefer to attach it to the under side of the floor of the vehicle behind the two hind wheels, which are represented in dotted lines at W and W' in the drawings, and their axle at X in Fig. 1.

A bracket, A, fixedly attached to the under side of the floor of the vehicle, is constructed of suitable shape, and provided with bearings, B and B', for a vertical spindle or swiveled stem, C, having a splining groove, D, therein, and for a disk, E, splined to said stem so as to be turned thereby, while the bracket and bearings, and therewith the disk, are free to rise and fall with the body of the vehicle. The stem C is rigidly connected to a forked frame, H, in which the caster wheel, K, is mounted. This wheel may be of any desired shape and size.

A downwardly pressing spring, G, surrounding the stem C beneath the lower bearing B' of the bracket A and seated upon the top of the forked frame H, serves to keep the caster wheel K down hard upon the ground, and a collar, D', at the upper end of the stem, interacts with the upper bearing B to prevent the stem from sliding through the bearings when the vehicle is raised from the ground or passes over a hollow in the surface.

Two horizontally disposed pitmen, F and F', are pivoted to the disk E and are connected at their other ends by bell-crank levers, N and N', and links, O and O', with the valves, P and P', of the sand boxes, S and S'. The levers N and N' work on fixed fulcrums, R and R', which may be attached to the bottom of the body of the vehicle in common with the other fixedly supported parts of the device.

A recess or slot, M, formed or cut in the disk E, interacts with a locking lever, L, which is thrust therein when the vehicle is being reversed or backed or when otherwise found necessary. This lever L can either be connected or attached to the reversing lever or can be worked independently by a separate lever from the driver's seat.

A cover or guard, T, of any suitable material, can be fastened in place around the bracket A and the moving parts at and near the same for keeping dirt and grit from the mechanism.

With the locking lever L retracted so as to free the disk E, and the caster wheel K pressed into effective contact with the ground by the spring G, as in Fig. 1, the caster wheel normally trails idly at the rear of the vehicle in a substantially straight path.

In the event of skidding the bracket A would move with the body of the vehicle, and the caster wheel K, held by inertia and its independent contact with the ground, would be the last thing to partake of the skidding movement. Meanwhile the lateral movement of the stem C with the bracket A would cause the caster and therewith the disk E to turn relatively to the bracket and other fixedly supported parts including the fulcrums R and R'. And such relative turning of the disk E, acting through the pitmen F and F', the levers N and N' and the links O and O', operates the valves P and P' in such a way as to open the appropriate sand box S or S', or it might be both of them, and thus enable the main wheels W and W', or one of them, to regain control.

The valves P and P' and the sand boxes S and S' may for the purposes of this invention be of any appropriate known or improved construction.

Having thus described said improvement, I claim as my invention and desire to patent under this specification:

1. The combination, in a motor vehicle or other road vehicle, of a caster normally pressed into effective contact with the ground, a support for its swiveled vertical stem attached underneath the vehicle body and movable laterally therewith, a sanding device, having one of its parts movable for the discharge of sand, and means for transmitting motion from said stem to such movable part of the sanding device when the caster is caused to turn in relation to its support, as by skidding.

2. The combination, in a motor vehicle or other road vehicle, of a caster normally pressed into effective contact with the ground, a support for its swiveled vertical stem attached underneath the vehicle body and movable laterally therewith, a pair of sand boxes correspondingly supported having outlets near a pair of main wheels respectively and each provided with a valve, and means for transmitting motion from said stem to said valves when the caster is caused to turn in relation to its support, as by skidding.

3. The combination, in a motor vehicle or other road vehicle, of a caster, a support for its swiveled vertical stem attached underneath the vehicle body and movable laterally therewith, a disk splined to said stem, a downwardly pressing spring beneath said bracket tending to keep the caster in effective contact with the ground, a sanding device having one of its parts movable for the discharge of sand, and means for transmitting motion from said disk to such movable part of the sanding device when the caster is caused to turn in relation to its support, as by skidding.

4. The combination, in a motor vehicle or other road vehicle, of a caster, a support for its swiveled vertical stem attached underneath the vehicle body and movable laterally therewith, a disk splined to said stem, a downwardly pressing spring beneath said bracket tending to keep said caster in effective contact with the ground, a sanding device having one of its parts movable for the discharge of sand, means for transmitting motion from said disk to such movable part of the sanding device when the caster is caused to turn in relation to its support, as by skidding, and means for locking said disk and therewith said sanding device to render the same inoperative at will, substantially as hereinbefore specified.

In testimony whereof I affix my signature in the presence of two witnesses.

HENRY TURNER.

Witnesses:
H. D. JAMESON,
F. L. RANDS.